(12) United States Patent
Shiga et al.

(10) Patent No.: US 7,567,443 B2
(45) Date of Patent: Jul. 28, 2009

(54) POWER CONVERTER

(75) Inventors: Toshitaka Shiga, Niiza (JP); Ryuichi Furukoshi, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 377 days.

(21) Appl. No.: 11/543,330

(22) Filed: Oct. 4, 2006

(65) Prior Publication Data
US 2007/0076446 A1   Apr. 5, 2007

(30) Foreign Application Priority Data
Oct. 5, 2005   (JP) ............................. 2005-292801

(51) Int. Cl.
*H02M 3/335* (2006.01)
(52) U.S. Cl. ...................................... 363/17
(58) Field of Classification Search ............... 363/15, 363/16, 17, 20, 21.02, 21.12, 22, 95, 97, 363/131, 132
See application file for complete search history.

(56) References Cited
U.S. PATENT DOCUMENTS
4,878,163 A * 10/1989 Yamato et al. ............... 363/8
2007/0263421 A1 * 11/2007 Kyono ........................ 363/127

FOREIGN PATENT DOCUMENTS
JP   8-23421   1/1996

* cited by examiner

*Primary Examiner*—Adolf Berhane
(74) *Attorney, Agent, or Firm*—Bachman & LaPointe, P.C.

(57) ABSTRACT

A power converter is provided which comprises two main MOS-FETs 4, 5 connected in series to a DC power source 1; an oscillator 2 which has two capacitors 3a, 3b connected in parallel to main MOS-FETs 4, 5; a primary winding 9a of a transformer 9 connected between a junction of two main MOS-FETs 4, 5 and a junction of two capacitors 3a, 3b; an electricity controller 12, 37 which comprises first and second regulatory MOS-FETs 10, 35, 12, 37 connected between respectively one and the other ends of a secondary winding 9b, 9c of transformer 9 and a speaker 15, 40; a polarity detector 51 for detecting the polarity of AC voltage produced on secondary winding 9b, 9c of transformer 9 by the on and off operation of MOS-FETs 4, 5 to generate detection signals; and a drive circuit 24, 25, 49, 50 for receiving detection signals from polarity detector 51 to control the on and off operation of first and second regulatory MOS-FETs 10, 35, 11, 36 to simplify the circuit configuration and improve power conversion efficiency in the power converter.

9 Claims, 7 Drawing Sheets

(A) Voltage on detective secondary winding 9d (B) Output voltage from oscillator 55

$V_{IN1}-V_{O1}$ (C) Output from PWM modulator 19

(D) Output from AND gate 61

(E) Output from AND gate 64

(F) Output from regulatory MOS-FET 10,11 without low pass filter

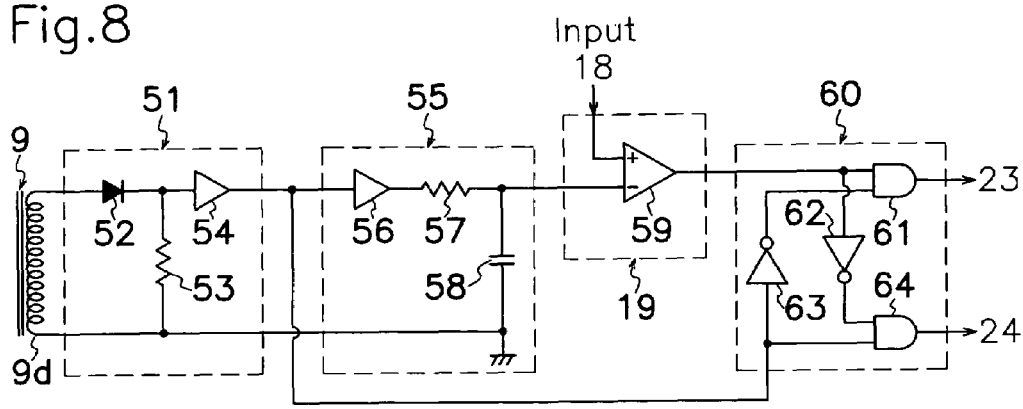
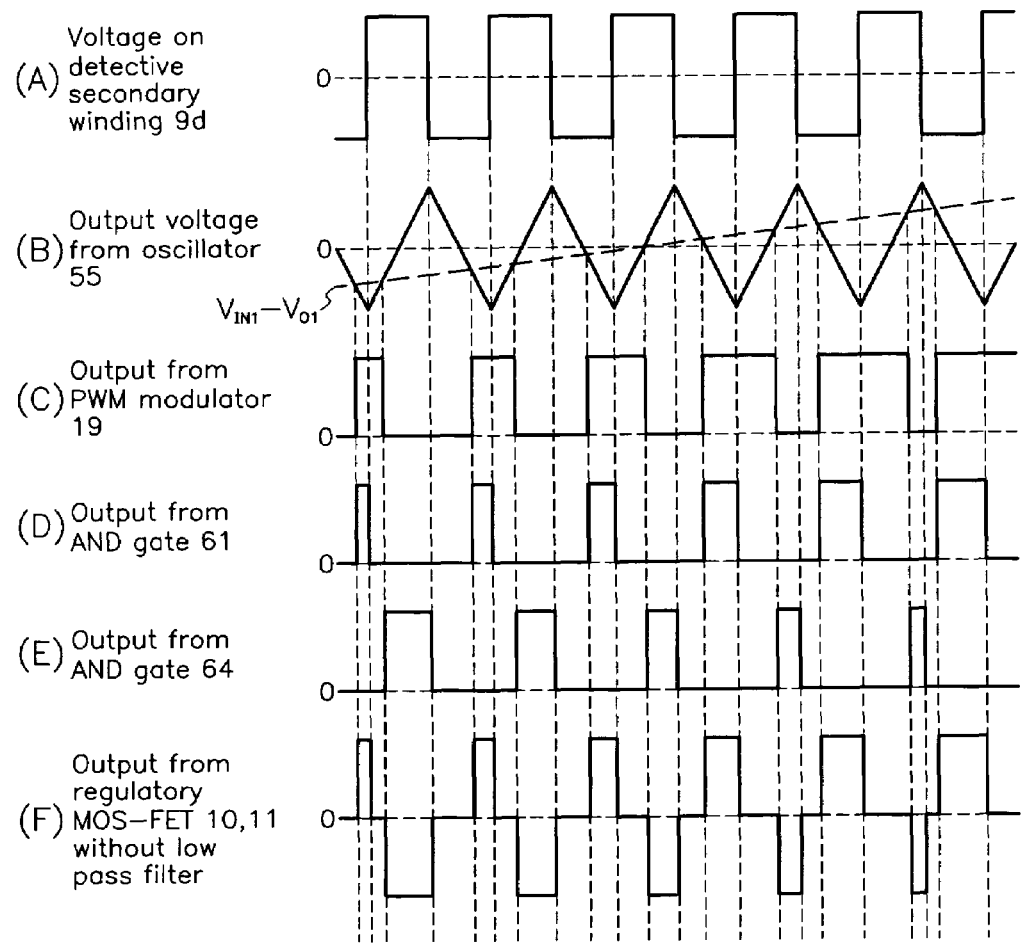

US 7,567,443 B2

POWER CONVERTER

TECHNICAL FIELD

This invention relates to an electric power converter such as a power amplifier in particular of the type for activating an electric load such as a speaker for acoustic equipment.

BACKGROUND OF THE INVENTION

In acoustic equipment having a speaker as a load, recently, a D-class or digital amplifier has been in practical use to amplify audio signals recorded on optical diskettes such as CDs or compact disks, and an electric power converter has been utilized which comprises a switching power generator for supplying electric power from AC power source to D-class amplifier. Such a power converter incorporated with D-class amplifier and switching power generator is superior in power conversion efficiency to produce larger power signals in small size of the converter, compared to prior art power converter incorporated with low frequency transformer and analog amplifier.

FIG. 10 shows an example of prior art power converters utilizing a switching power generator and two D-class power amplifiers connected to the subsequent stage of the switching power generator. Switching power generator of prior art converter shown in FIG. 10 comprises a DC power source 1 which comprises a rectifying bridge circuit 1b connected to a commercial AC power source 1a and an input smoothing capacitor 3 connected to bridge circuit 1b; a primary winding 9a of a transformer 9 and a main MOS-FET 4 as a main switching element connected in series to one and the other ends of input smoothing capacitor 3; a positive output commutating diode 26 having the anode terminal connected to one end of a secondary winding 9b of transformer 9; a positive output smoothing capacitor 27 connected between cathode terminal of commutating diode 26 and a grounded center tap 9e of transformer 9; a negative output commutating diode 28 having the cathode terminal connected to the other end of secondary winding 9b of transformer 9; a negative output smoothing capacitor 29 connected between anode terminal of commutating diode 28 and grounded center tap 9e of transformer 9; voltage-detecting resistors 30, 31 connected in parallel to output smoothing capacitors 27 and 29 connected in series to each other; an error amplifier 33 for producing a signal of differential voltage between a junction voltage $V_A$ of voltage-detecting resistors 30, 31 and a reference voltage $V_R$ from a normal power source 32; a main control circuit 6 for producing drive signals to main MOS-FET 4; a photo-coupler 34 which has a light emitter 34a and a light receiver 34b for transmitting differential voltage signal from error amplifier 33 to a feedback signal input terminal FB of main control circuit 6 which turns main MOS-FET 4 on and off based on differential voltage signal from error amplifier 33 to feedback terminal FB through photo-coupler 34, and an auxiliary power source 7 for supplying DC voltage $V_{CC}$ to a power input terminal $V_{CC}$ of main control circuit 6 for activation.

Each of power amplifiers connected to the output stage of the switching power generator, comprises first and second regulatory MOS-FETs 10, 11, 35, 36 as first and second regulatory switching elements connected to respectively upper end of positive smoothing capacitor 27 and lower end of negative smoothing capacitor 29 and connected in parallel to voltage-detecting resistors 30 and 31; a choke coil 13, 38 having one end connected to a junction of first and second regulatory MOS-FET 10, 11, 35, 36; a filtering capacitor 14, 39 connected between the other end of choke coil 13, 38 and source terminal of second regulatory MOS-FET 11, 36; a speaker 15, 40 as a load connected in parallel to filtering capacitor 14, 39; dividing resistors 16, 17, 41, 42 connected between a junction of choke coil 13 and filtering capacitor 14 and ground; an output error amplifier 18, 43 for producing a signal of potential difference between a voltage of an external input signal $V_{IN1}$, $V_{IN2}$ and a divided voltage $V_{O1}$, $V_{O2}$ on junction of dividing resistors 16, 17, 41, 42; a PWM modulator 19, 44 as a pulse modulating circuit for receiving outputs from output error amplifier 18, 43 to produce PWM (pulse width modulation) signals with the varied pulse duration; positive and negative waveform shapers 20, 21, 45, 46 for adding dead times to PWM signals from PWM modulator 19, 44; an inverter 22, 47 for producing inverted signals of output signals from positive adder 21, 46; a level shift circuit 23, 48 for elevating or boosting voltage level of output signals from inverter 22, 47 by the potential applied on junction of first and second regulatory MOS-FETs 10, 11, 35, 36; a negative drive circuit 24, 49 for receiving output signals from negative waveform shaper 20, 45 to provide drive signals for a gate terminal of second regulatory MOS-FET 11, 36 for the on and off operation thereof; and a positive drive circuit 25, 50 for receiving output signals from level shift circuit 23, 48 to provide drive signals for a gate terminal of first regulatory MOS-FET 10, 35 for the on and off operation thereof. Choke coil 13, 38 and filtering capacitor 14, 39 constitute a low pass filtering circuit for allowing only sine wave signals of audible frequency bandwidth to pass therethrough. In the circuitry shown in FIG. 10, applied to non-inverted input terminal + of output error amplifier 18, 43, are audio or voice input signals as external input signals $V_{IN1}$, $V_{IN2}$ output from for example a microphone or CD player not shown.

In operation of prior art power converter shown in FIG. 10, AC voltage E from commercial AC power source 1a is subject to full-wave rectification through rectifying bridge circuit 16, and then smoothed through smoothing capacitor 3 into a DC voltage. When main control circuit 6 delivers drive pulse signals to gate terminal of main MOS-FET 4 to turn main MOS-FET 4 on and off, DC voltage is intermittently applied from smoothing capacitor 3 to primary winding 9a of transformer 9 to produce DC voltage of rectangular waveform across primary winding 9a. Accordingly, induced at both ends of secondary winding 9b of transformer 9 is AC voltage of rectangular waveform which is then converted into positive and negative DC voltages by two rectifying smoothers, one having combined positive commutating diode 26 and positive smoothing capacitor 27, and the other having combined negative commutating diode 28 and negative smoothing capacitor 29. Specifically, while DC voltage of positive polarity is produced across or between opposite ends of positive smoothing capacitor 27, DC voltage of negative polarity is produced across or between opposite ends of negative smoothing capacitor 29. Detecting resistors 30, 31 pick out voltage developed between upper end of positive smoothing capacitor 27 and bottom end of negative smoothing capacitor 29, and error amplifier 33 produces error voltage signals between detected voltage $V_A$ on junction of detecting resistors 30, 31 and reference voltage $V_R$ of normal power source 32. Error voltage signals activate light emitter 34a of photo-coupler 34 to transmit error voltage signals to feedback input terminal FB of main control circuit 6 through light receiver 34b so that main control circuit 6 controls duty ratio of drive pulses to gate terminal of main MOS-FET 4 based on error voltage signals to feedback input terminal FB. Thus, stabilized positive and negative DC voltages can be applied to opposite ends of positive and negative smoothing capacitors 27 and 29 to apply these DC voltages on first and second regulatory MOS-FETs 10, 11, 35, 36 of power amplifiers.

In each power amplifier, AC voltage can be applied to each speaker 15, 40 through choke coil 13, 38 and filtering capacitor 14, 39 by alternately turning first and second regulatory MOS-FETs 10, 11, 35, 36 on and off. AC voltage applied on speaker 15, 40 is split by dividing resistors 16, 17, 41, 42 to apply to inverted input terminal − voltage $V_{O1}$, $V_{O2}$ appearing on junction of dividing resistors 16, 17, 41, 42. Output error amplifier 18, 43 generates potential difference signals between voltage $V_{IN1}$, $V_{IN2}$ of external input signal applied to non-inverted input terminal + and voltage $V_{O1}$, $V_{O2}$ appearing on junction of dividing resistors 16, 17, 41, 42, and then, PWM modulator 19, 44 issues PWM signals the pulse length of which is varied in proportion to potential difference signals from output error amplifier 18, 43 to generate PWM signals of pulse width proportional to amplitude of external input signal $V_{IN1}$, $V_{IN2}$ from PWM modulator 19, 44. PWM signals from PWM modulator 19, 44 are supplied to positive and negative waveform shapers 20, 21, 45, 46 which add to PWM signals dead times during which first and second regulatory MOS-FETs 10, 11, 35, 36 are concurrently turned off. PWM signals to which negative waveform shaper 20, 45 adds dead times, are furnished to gate terminal of second regulatory MOS-FET 11, 36 through negative drive circuit 24, 49 to turn second regulatory MOS-FET 11, 36 on and off. On the other hand, PWM signals to which positive waveform shaper 21, 46 adds dead times are furnished to gate terminal of first regulatory MOS-FET 10, 35 through inverter 22, 47, level shift circuit 23, 48 and positive drive circuit 25, 50 to turn first regulatory MOS-FET 10, 35 on and off. Thus, each pulse width of PWM signals is varied based on external input signals $V_{IN1}$, $V_{IN2}$ from for example a microphone or CD player to alternately turn first and second regulatory MOS-FETs 10, 11, 35, 36 on and off by PWM signals with the changing pulse length so that AC pulse signals $V_{P1}$, $V_{P2}$ with the modulated pulse width are produced from junction between first and second regulatory MOS-FETs 10, 11, 35, 36. AC pulse signals $V_{P1}$, $V_{P2}$ are supplied from junction of first and second MOS-FETs 10, 11, 35, 36 to speaker 15, 40 through low pass filter of choke coil 13, 38 and filtering capacitor 14, 39 for removing high harmonic wave over audible frequency from AC pulse signals $V_{P1}$, $V_{P2}$ commensurate or proportional to external input signals $V_{IN1}$, $V_{IN2}$.

For example, Japanese Patent Disclosure No. 8-23241 represents a power amplifier which comprises an inverter for converting DC voltage into pulsatile AC voltage supplied to switches through a half-wave rectifier; a binary state modulator for converting audio signals such as voice into pulse signals to turn the switches on and off by means of these pulse signals for pulse number modulation of pulsatile AC voltage; a filter for restricting a part of bandwidth in output signals from the switches; and a demodulator for demodulating the output signals into power-amplified audio signals applied to a load through output terminals. As this power amplifier does not need conversion of output voltage from inverter into DC voltage ever once, it can dispense with smoothing capacitor advantageously with increased power conversion efficiency and with less noise because of conversion of output voltage from inverter into a sine wave.

Prior art power converter shown in FIG. 10 firstly converts AC voltage E from commercial AC power source 1a into positive and negative DC voltages through transformer 9 by turning main MOS-FET 4 of the switching power generator on and off, secondly again converts positive and negative DC voltages into pulsatile AC signal $V_{P1}$, $V_{P2}$ of several hundred kilohertz by turning each regulatory MOS-FET 10, 11, 35, 36 of power amplifier on and off synchronously with external input signals $V_{IN1}$, $V_{IN2}$ supplied from microphone or CD player, and then thirdly supplies, to speaker 15, 40 through low pass filtering circuit, AC signals of waveform analogous or similar to that of external input signals $V_{IN1}$, $V_{IN2}$ to regenerate amplified voice signals. In this way, the converter requires the double stages of high frequency switching operation inconveniently with associated increased switching noise and power loss by heat generated from positive and negative commutating diodes 26, 28 connected at the output stage of the switching power generator, thereby causing power conversion efficiency to drop. Also, the converter disadvantageously has the complicated circuit configuration because secondary winding 9b of transformer 9 is connected to a pair of rectifying smoothers which comprise two combinations of positive output rectifying diode 26 and smoothing capacitor 27, and negative output rectifying diode 28 and smoothing capacitor 29 to produce positive and negative DC voltages.

The power amplifier shown in the above Japanese Disclosure turns the switches on and off by means of pulse signals for pulse number modulation of pulsatile AC voltage beneficially without smoothing capacitor, however, it requires a half-wave rectifier which undesirably causes decrease in power conversion efficiency like the converter shown in FIG. 10. Moreover, the power amplifier needs a filtering circuit of a choke coil and a capacitor between output side of the switches and a load such as a speaker for demodulation into audio signals so that such a filtering circuit hinders simplification of circuit configuration.

An object of the present invention is to provide a power converter capable of improving power conversion efficiency with a simplified circuit configuration.

SUMMARY OF THE INVENTION

The power converter according to the present invention comprises at least two main switching elements (4, 5) connected in series to a DC power source (1); an oscillator (2) which has at least two capacitors (3a, 3b) or at least two subsidiary switching elements (4a, 5a) connected in parallel to main switching elements (4, 5) and in series to DC power source (1); a primary winding (9a) of a transformer (9) connected between a junction of two main switching elements (4, 5) and a junction of two capacitors (3a, 3b) or of two subsidiary switching elements (4a, 5a); an output circuit (12, 37) which comprises first and second regulatory switching elements (10, 35, 12, 37) connected between respectively one and the other ends of a secondary winding (9b, 9c) of transformer (9) and an electric load (15, 40); a polarity detector (51) for detecting the polarity of AC voltage produced on secondary winding (9b, 9c) of transformer (9) by the on and off operation of switching elements (4, 5, 4a, 5a) in oscillator (2) to generate detection signals; and a drive circuit (24, 25, 49, 50) for receiving detection signals from polarity detector (51) to control the on and off operation of first and second regulatory switching elements (10, 35, 11, 36).

The power converter can directly induce AC voltage on secondary winding (9b, 9c) of transformer (9) by turning each switching element (4, 5, 4a, 5a) in oscillator (2) on and off advantageously without any inverter circuit or DC-AC converter to be connected to secondary winding (9b, 9c) of transformer (9) for simplification of circuit configuration. Also, polarity detector (51) detects polarity of AC voltage produced on secondary winding (9b, 9c) of transformer (9) to turn first and second regulatory switching elements (10, 35, 11, 36) on and off through drive circuit (25, 24, 50, 49) by detection signals output from polarity detector (51) so that this operation can attain an efficient control of AC power supplied to load (15, 40) from secondary winding (9b, 9c) for improvement in power conversion efficiency.

The power converter according to the present invention can materialize simplification of circuit configuration to provide an inexpensive power converter without an inverter circuit to be connected to secondary winding of transformer in a switching power generator. In addition, the power converter can efficiently control AC power supplied from secondary winding to load with simplified circuit configuration by turning first and second regulatory switching elements on and off in synchronization with AC voltage appearing on secondary winding of transformer to thereby accomplish a highly efficient power converter.

BRIEF DESCRIPTION OF THE DRAWINGS

The above-mentioned and other objects and advantages of the present invention will be apparent from the following description in connection with preferred embodiments shown in the accompanying drawings wherein:

FIG. 8 is a circuit diagram showing a fifth embodiment of the power converter according to the present invention;

FIG. 9 is a waveform diagram indicating change in voltages at selected positions of the circuit diagram in FIG. 8 during the operation of the power converter;

BEST MODE FOR CARRYING OUT THE INVENTION

Figure 10:
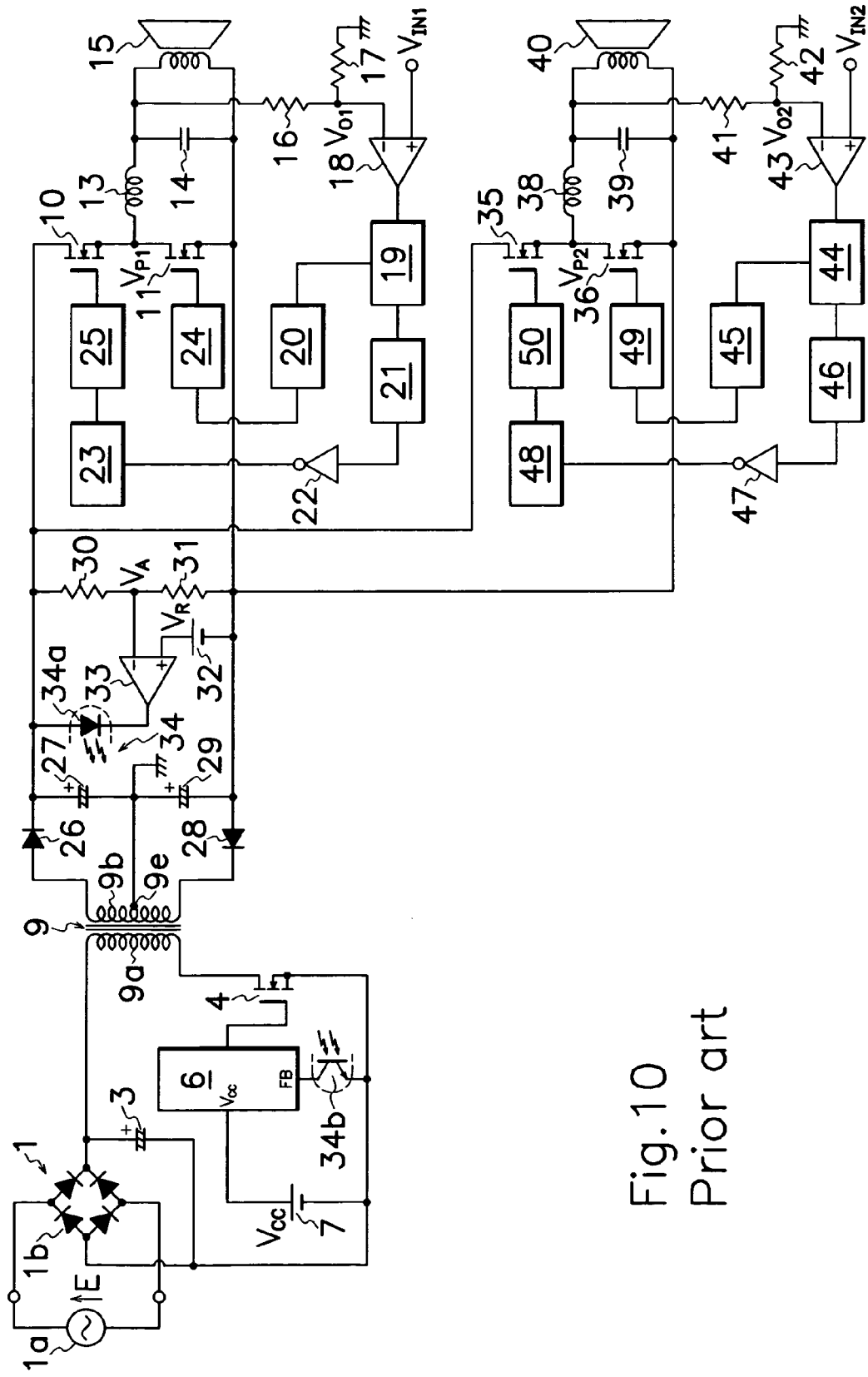
FIG. 10 is a circuit diagram showing a prior art power converter.

Embodiments of the power converter according to the present invention will be described hereinafter in connection with FIGS. 1 to 9 of the drawings. Same reference symbols as those shown in FIG. 10 are applied to similar portions in these drawings, omitting explanation therefor.

Figure 1:
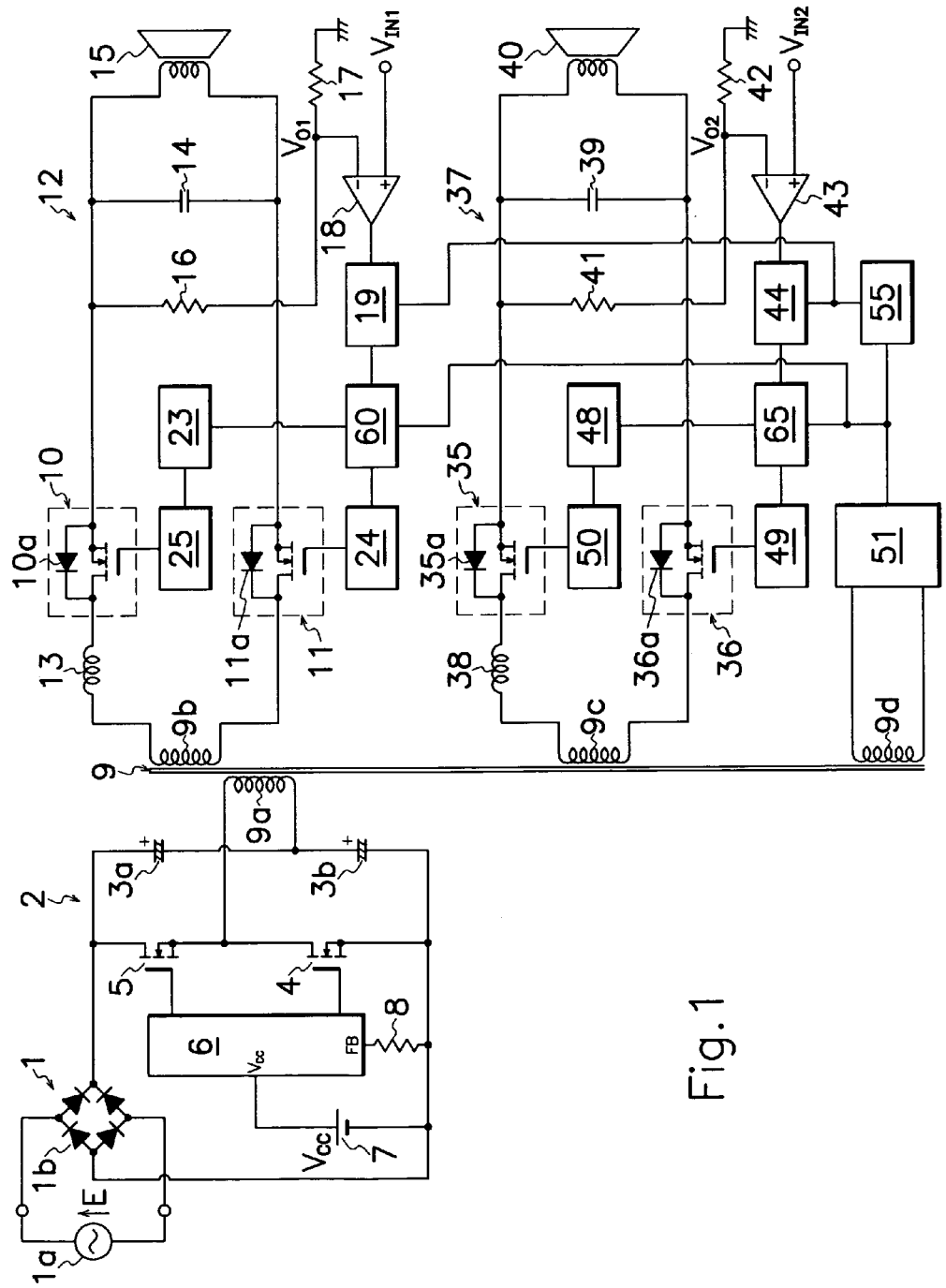
FIG. 1 is a circuit diagram showing a first embodiment of a power converter according to the present invention.

As shown in FIG. 1, the power converter of a first embodiment according to the present invention, has a switching power generator which comprises first and second main MOS-FETs 4 and 5 as two main switching elements connected in series to a DC power source 1 having a rectifying bridge circuit 1b connected to a commercial AC power source 1a; an oscillator 2 having two capacitors 3a and 3b connected in parallel to first and second main MOS-FETs 4 and 5 and in series to DC power source 1; a primary winding 9a of a transformer 9 connected between a junction of first and second main MOS-FETs 4 and 5 and a junction of two capacitors 3a and 3b; a main control circuit 6 for producing drive pulse signals to alternately turn first and second MOS-FETs 4 and 5 on and off so that AC voltage of rectangular waveform is produced from first and second secondary windings 9b and 9c of transformer 9; and an auxiliary power source 7 for supplying DC voltage $V_{CC}$ to a power input terminal $V_{CC}$ of main control circuit 6 for activation. In the shown embodiment, first and second main MOS-FETs 4 and 5 are alternately turned on and off with their 50% duty ratio by a resistor 8 of a selected resistance value connected to feedback input terminal FB of main control circuit 6 to determine and maintain the duty ratio at a given set value.

Provided on the output side of switching power generator are a pair of power amplifiers each of which comprises an electricity controller 12, 37 as an output circuit incorporating a first regulatory MOS-FET 10, 35 as a first regulatory switching element and a second regulatory MOS-FET 11, 36 as a second regulatory switching element respectively connected between upper and bottom ends of first and second secondary windings 9b, 9c of transformer 9 and a speaker as a load; a choke coil 13, 38 connected between first and second secondary winding 9b, 9c of transformer 9 and first regulatory MOS-FET 10, 35; a filtering capacitor 14, 39 connected in parallel to a speaker 15, 40; a polarity detector 51 for detecting the polarity of AC voltage produced on a detective secondary winding 9d of transformer 9 by the on and off operation of main MOS-FETs 4, 5 in oscillator 2 to generate detection signals; a chopping wave oscillator 55 for generating chopping wave signals synchronous with output signals from polarity detector 51; output voltage dividing resistors 16, 17, 41, 42 connected between an upper end of filtering capacitor 14, 39 and ground; an output error amplifier 18, 43 for producing a potential difference signal between voltage $V_{IN1}$, $V_{IN2}$ of external input signals and voltage $V_{O1}$, $V_{O2}$ on junction of dividing resistors 16, 17, 41, 42; a PWM modulator 19, 44 as a pulse modulator for comparing voltages of potential difference signals from output error amplifier 18, 43 and chopping wave signals from chopping wave oscillator 55 to produce PWM signals of varying pulse width; a changeover circuit 60, 65 for producing output signals to turn first regulatory MOS-FET 10, 35 on when PWM modulator 19, 44 produces a PWM signal of high voltage level and simultaneously polarity detector 51 produces a detection signal of high voltage level, and to turn second regulatory MOS-FET 11, 36 on when PWM modulator 19, 44 produces a PWM signal of low voltage level and simultaneously polarity detector 51 produces a detection signal of low voltage level; a level shift circuit 23, 48 source voltage for shifting voltage level of output signals from changeover circuit 60, 65 upward by the source potential of first regulatory MOS-FET 10, 35; a negative drive circuit 24, 49 for receiving output signals from changeover circuit 60, 65 to produce output signals to turn second regulatory MOS-FET 11, 36 on and off; and a positive drive circuit 25, 50 for receiving output signals from level shift circuit 23, 48 to produce output signals to turn first regulatory MOS-FET 10, 35 on and off. In these power amplifiers, AC power of voltage waveform similar to waveform of external input signals $V_{IN1}$, $V_{IN2}$ is supplied to speaker 15, 40 from each secondary winding 9b, 9c of transformer 9 through choke coil 13, 38 and filtering capacitor 14, 39 by alternately turning first and second regulatory MOS-FETs 10, 11, 35, 36. First and second parasitic diode 10a, 11a, 35a, 36a are connected in adversely parallel respectively between drain and source terminals of first and second MOS-FETs 10, 11, 35, 36. Choke coil 13, 18 and filtering capacitor 14, 39 constitute a low pass filtering circuit for passing only sine waveform signals of audible frequency band. Also, in this embodiment, supplied to non-inverted input terminal + of output error amplifier 18, 43 are voice output signals as external input signals $V_{IN1}$, $V_{IN2}$ provided from microphone or CD player not shown.

Figure 2:
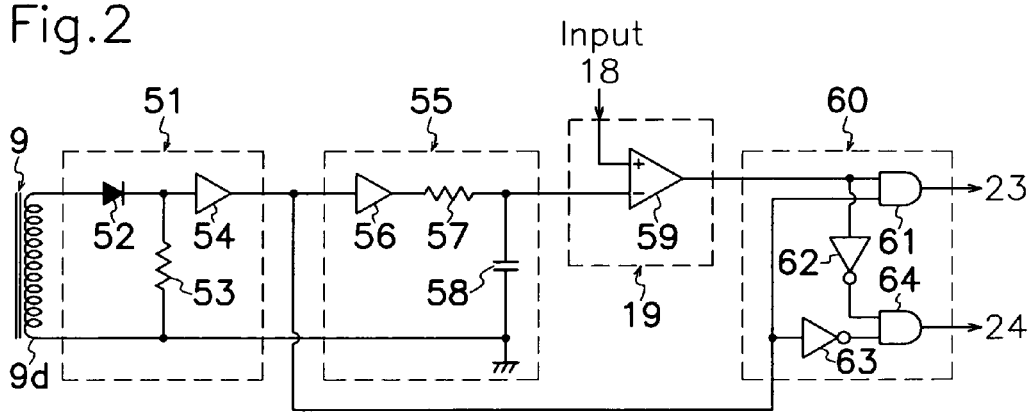
FIG. 2 is a detailed circuit diagram representing a polarity detector, a chopping wave oscillator and a level shift circuit shown in FIG. 1.
Figure 3:
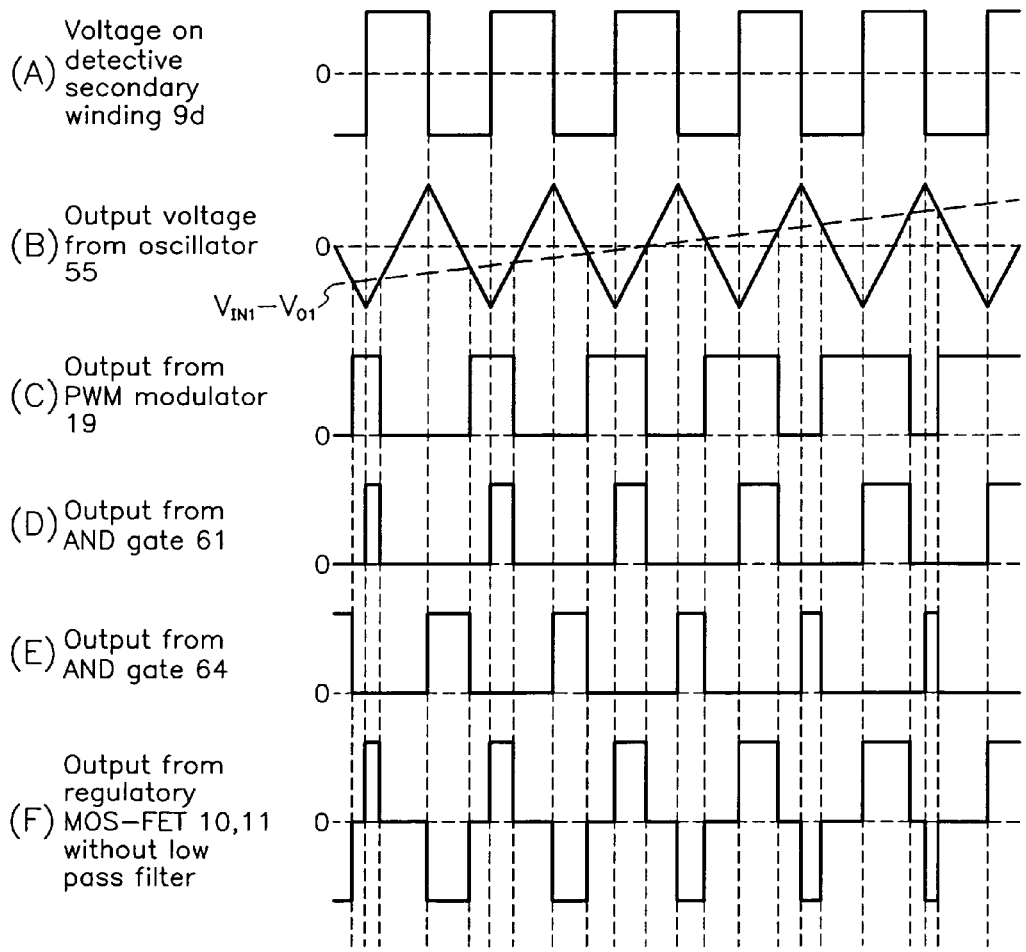
FIG. 3 is a waveform diagram indicating change in voltages at selected positions of the circuit diagram in FIG. 1 during the operation of the power converter.
Figure 4:
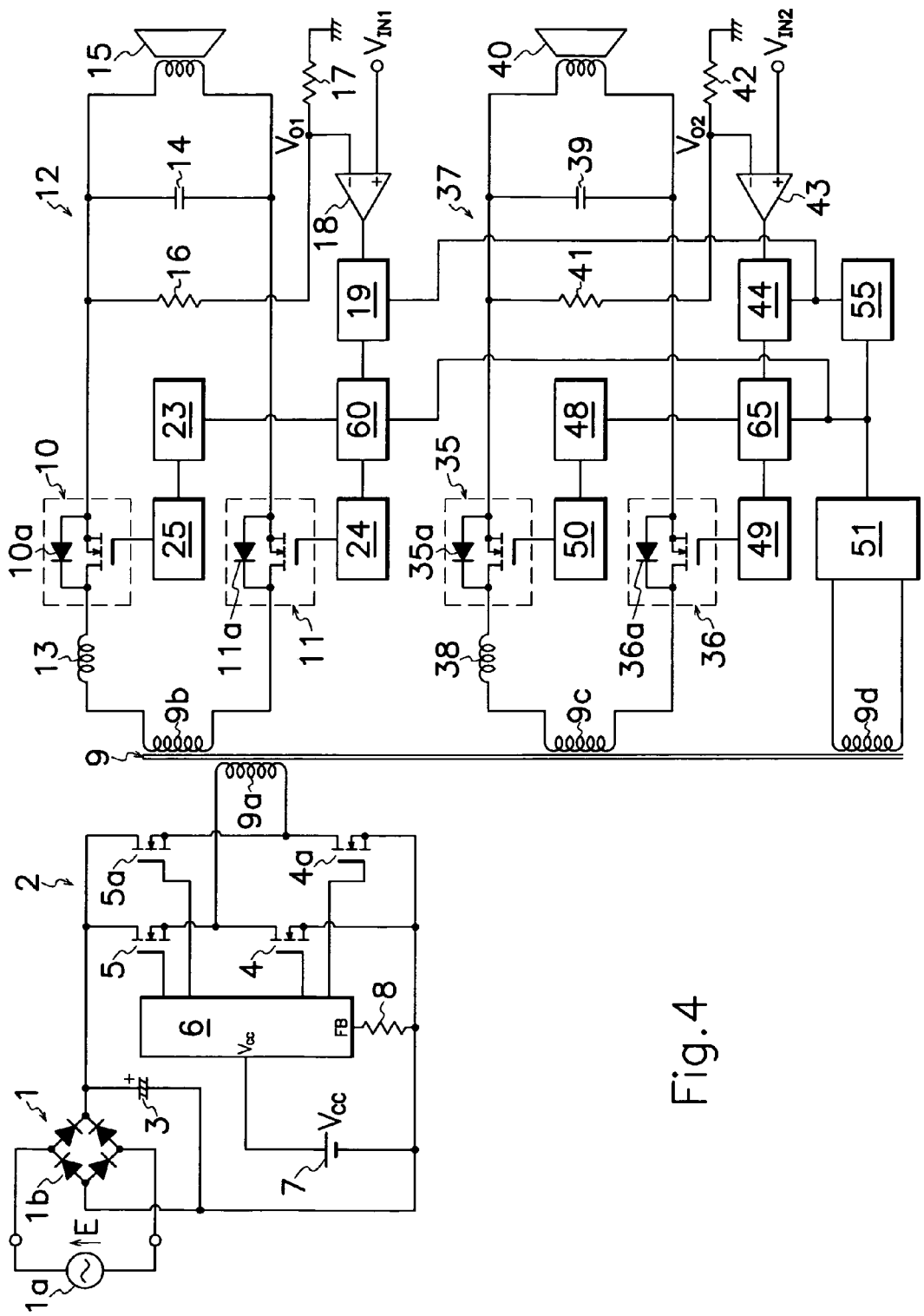
FIG. 4 is a circuit diagram showing a second embodiment of the power converter according to the present invention.
Figure 5:
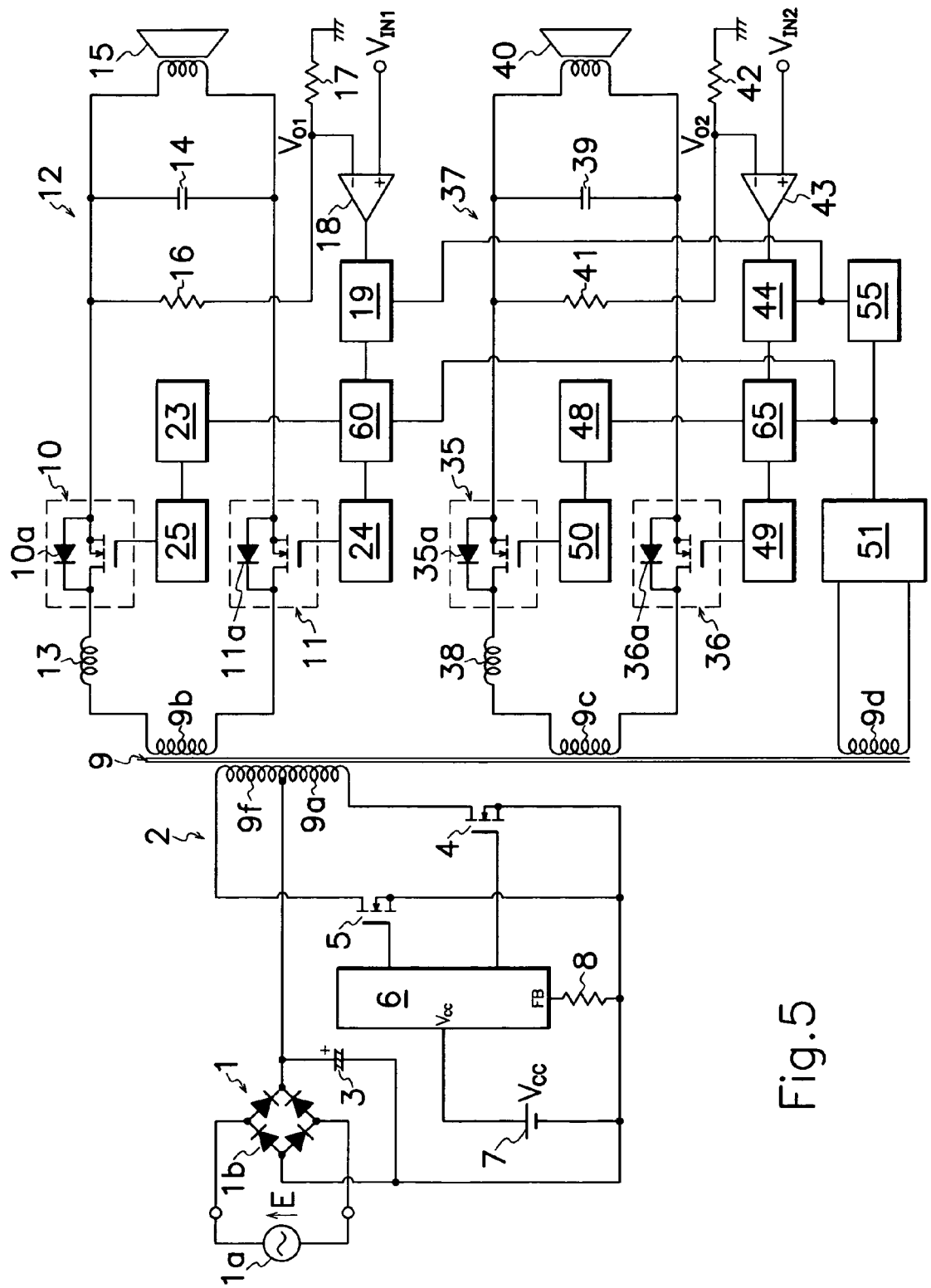
FIG. 5 is a circuit diagram showing a third embodiment of the power converter according to the present invention.
Figure 6:
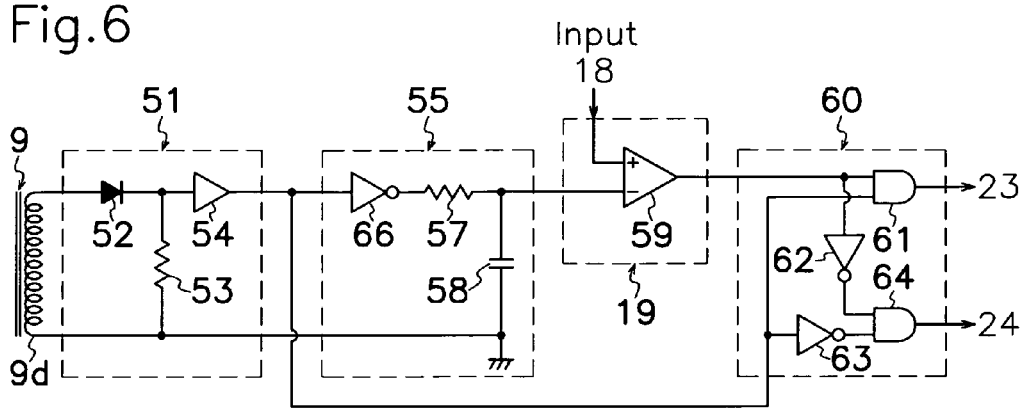
FIG. 6 is a circuit diagram showing a fourth embodiment of the power converter according to the present invention.
Figure 7:
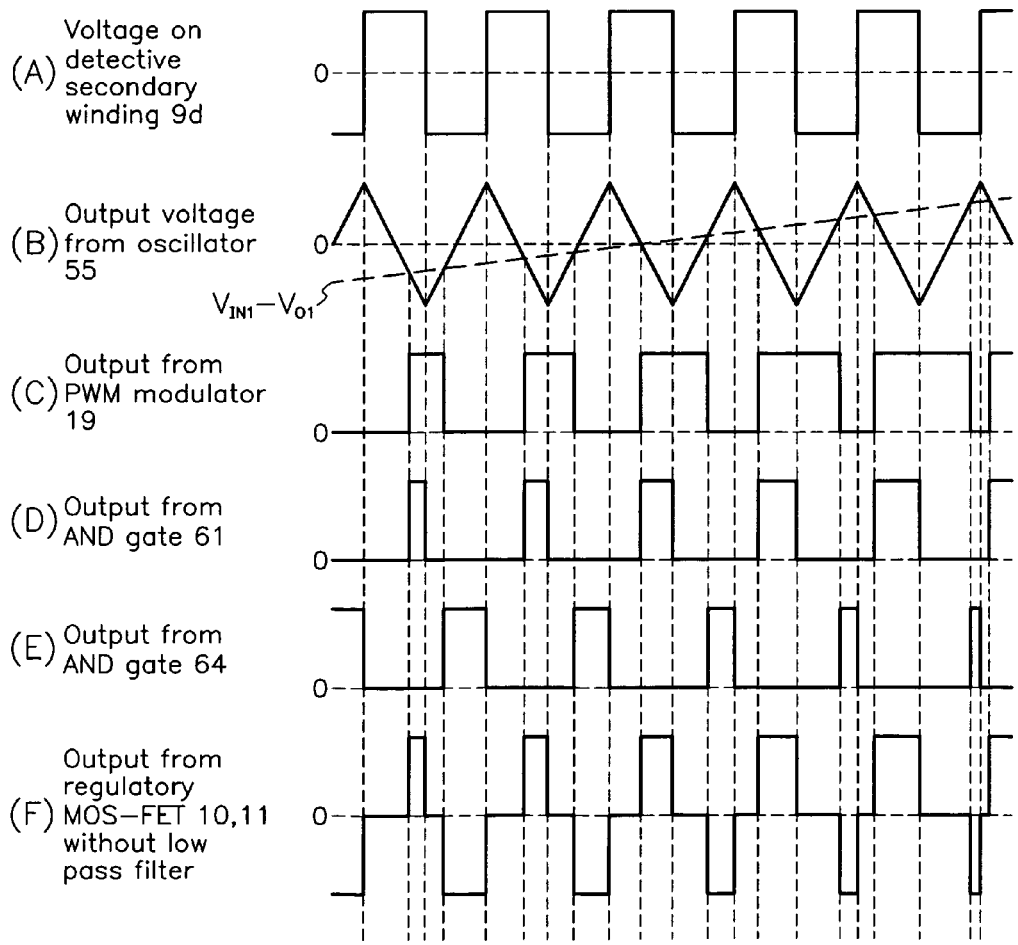
FIG. 7 is a waveform diagram indicating change in voltages at selected positions of the circuit diagram in FIG. 6 during the operation of the power converter.

As shown in FIG. 2, polarity detector 51 comprises a diode 52 having an anode terminal connected to an upper end of detective secondary winding 9d of transformer 9; a resistor 53 having one end connected to a cathode terminal of diode 52 and the other connected to a bottom end of detective secondary winding 9d; and a first buffer amplifier 54 connected to a junction of cathode terminal of diode 52 and resistor 53. When detective secondary winding 9d of transformer 9 produces positive voltage at the upper end and negative voltage at the bottom end to bias diode 52 in the forward direction so that voltage of positive polarity is generated between both ends of resistor 53 to issue a detection signal of high voltage level from first buffer amplifier 54. Adversely, when detective secondary winding 9d of transformer 9 produces negative voltage at the upper end and positive voltage at the bottom end to bias diode 52 in the inverse direction so that voltage of negative polarity is generated between both ends of resistor 53 to issue a detection signal of low voltage level from first buffer amplifier 54. Chopping wave oscillator 55 comprises a second buffer amplifier 56 connected to first buffer amplifier 54 in polarity detector 51, and an integrating resistor 57 having one end connected to second buffer amplifier 56, and an integrating capacitor 58 connected between the other end of integrating resistor 57 and ground. When polarity detector 51 produces a detection signal of high voltage level to second buffer amplifier 56, integrating capacitor 58 is electrically charged through integrating resistor 57 to generate increasing ramp voltage across integrating capacitor 58 as shown in FIG. 3(B). Adversely, when polarity detector 51 produces a detection signal of low voltage level to second buffer amplifier 56, integrating capacitor 58 is electrically discharged through integrating resistor 57 to generate decreasing ramp voltage across integrating capacitor 58 as shown in FIG. 3(B). Thus, chopping wave oscillator 55 produces signals of triangular or pyramidal waveform synchronously with output signals from polarity detector 51 as shown in FIG. 3(B). PWM modulator 19 comprises a PWM comparator 59 which has a non-inverted input terminal + connected to output error amplifier 18 and an inverted input terminal − connected to a junction of integrating resistor 57 and capacitor 58 in chopping wave oscillator 55. PWM comparator 59 compares voltage ($V_{IN1}$-$V_{O1}$) shown by a dotted line in FIG. 3(B) of output signals from output error amplifier 18 with voltage of a chopping wave shown by solid line in FIG. 3(B) from chopping wave oscillator 55 to produce PWM signals with the changing pulse width in proportion to amplitude of external input signals $V_{IN1}$. Changeover circuit 60 comprises a positive AND gate 61 which has one input terminal connected to output terminal of PWM comparator 59 and the other input terminal connected to first buffer amplifier 54 of polarity detector 51 to produce output signals to level shift circuit 23, and a negative AND gate 64 which has one input terminal connected to output terminal of PWM comparator 59 through an inverter 62 and the other input terminal connected to first buffer amplifier 54 of polarity detector 51 through an inverter 63 to produce output signals to negative drive circuit 24. When both of polarity detector 51 or secondary winding 9d and PWM comparator 59 produce their outputs of high voltage level, positive AND gate 61 produces output signals of high voltage level to turn first regulatory MOS-FET 10 on as shown in FIG. 3(D) through level shift circuit 23 and positive drive circuit 25. In another aspect, when both of polarity detector 51 and PWM comparator 59 produce their outputs of low voltage level, negative AND gate 64 produces output signals of high voltage level to turn second regulatory MOS-FET 11 on through negative drive circuit 24. Not shown but, level shift circuit 23, 48 comprises a charge pump circuit or boot strap circuit or the like which has a boosting capacitor, and negative and positive drive circuits 24, 25, 49, 50 comprises a plurality of transistors or the like. Also, not shown but, circuit configuration similar to that shown in FIG. 2 is provided in PWM modulator 44 and changeover circuit 65 for second secondary winding 9c of transformer 9 for similar operations.

In operation of the power converter according to the first embodiment shown in FIG. 1, AC voltage E of commercial AC power source 1a is rectified with the full wave through rectifying bridge circuit 1b and smoothed and converted through two capacitors 3a, 3b into DC voltage. Main control circuit 6 produces drive pulses to each gate terminal of first and second main MOS-FETs 4 and 5 to alternately turn first and second main MOS-FETs 4 and 5 with the 50% duty ratio so that rectangular pulsatile AC voltage is applied on primary winding 9a of transformer 9. In this case, when first and second main MOS-FETs 4 and 5 are turned respectively off and on, voltage of capacitor 3a causes electric current to flow from capacitor 3a through second main MOS-FET 5, primary winding 9a of transformer 9 and capacitor 3a so that voltage of capacitor 3a is applied on primary winding 9a of transformer 9. Meanwhile, when first and second main MOS-FETs 4 and 5 are turned respectively on and off, voltage of capacitor 3a causes electric current to flow from capacitor 3b through primary winding 9a of transformer 9, first main MOS-FET 4 and capacitor 3b in the adverse direction so that voltage of capacitor 3b is inversely applied on primary winding 9a of transformer 9. This induces AC voltages of rectangular waveform on first and second secondary windings 9b, 9c of transformer 9 so that voltage values are determined by each turn ratio of primary, first and second secondary windings 9a, 9b, 9c. Simultaneously, AC voltage of rectangular waveform similar to the foregoing, is induced on detective secondary winding 2d of transformer 9 as shown in FIG. 3(A).

When first and second regulatory MOS-FETs 10, 11, 35, 36 are alternately turned on and off synchronously with polarity of rectangular AC voltage induced on first and second secondary winding 9b, 9c of transformer 9, AC voltage is applied on speaker 15, 40 through choke coil 13, 38 and filtering capacitor 14, 39. AC voltage applied on speaker 15, 40 is divided by output dividing resistors 16, 17, 41, 42 to apply divided voltage $V_{O1}$, $V_{O2}$ appearing on junction of dividing resistors 16, 17, 41, 42 to inverted input terminal − of output error amplifier 18, 43 which produces a signal of potential difference between voltage $V_{IN1}$, $V_{IN2}$ of external input signal on non-inverted input terminal + and divided voltage $V_{O1}$, $V_{O2}$ on junction of dividing resistors 16, 17, 41, 42 through inverted input terminal −.

At the same time, induced in detective secondary winding 9d of transformer 9 is AC voltage of rectangular wave supplied to polarity detector 51 which produces detection signals. When detective secondary winding 9d sets AC voltage off with the positive and negative polarities respectively at the upper and bottom ends of winding 9d, polarity detector 51 produces detection signals of high voltage level, and when detective secondary winding 9d sets AC voltage off with the negative and positive polarities respectively at the upper and bottom ends of winding 9d, polarity detector 51 produces detection signals of low voltage level. Detection signals from polarity detector 51 is forwarded to chopping wave oscillator 55 which generates signals of triangular wave shown a solid line in FIG. 3(B) synchronous with output signals from polarity detector 51. Triangular wave signals from chopping wave oscillator 55 is then supplied to inverted input terminal − of PWM comparator 59 of PWM modulator 19, 44 which compares triangular wave signals with output signals shown by dotted line in FIG. 3(B) from output error amplifier 18, 43, and develops PWM signals with the transforming pulse length commensurately to amplitude of external input signals $V_{IN1}$, $V_{IN2}$ as shown in FIG. 3(C). PWM signals from PWM modulator 19, 44 are sent to changeover circuit 60, 65 to which polarity detector 51 simultaneously produces detection signals so that changeover circuit 60, 65 applies drive pulse signals selectively to each gate terminal of first and second regulatory MOS-FET 10, 11, 35, 36 in synchronization of polarity in AC voltage on first and second secondary windings 9b, 9c of transformer 9. In this case, when both detection signal from polarity detector 51 and PWM signal from PWM modulator 19, 44 have their high voltage level, positive AND gate 61 of changeover circuit 60, 65 produces output signal shown in FIG. 3(D) to level shift circuit 23, 48 to turn first regulatory MOS-FET 10, 35 on through positive drive circuit 25, 50. When first regulatory MOS-FET 10, 35 is turned on, electricity flows from secondary winding 9b, 9c of transformer 9 through choke coil 13, 38, first regulatory MOS-FET 10, 35, filtering capacitor 14, 39 and speaker 15, 40 and second parasitic diode 11a, 36a to secondary winding 9b, 9c of transformer 9. On the contrary, when both detection signal from polarity detector 51 and PWM signal from PWM modulator 19, 44 have their low voltage level, negative AND gate 64 of changeover circuit 60, 65 produces output signal shown in FIG. 3(E) to negative drive circuit 24, 49 to turn second regulatory MOS-FET 11, 36 on through positive drive circuit 25, 50. When second regulatory MOS-FET 11, 36 is turned on, electricity flows from secondary winding 9b, 9c of transformer 9 through second regulatory MOS-FET 11, 36, filtering capacitor 14, 39 and speaker 15, 40, first parasitic diode 10a, 35a and choke coil 13, 38 to secondary winding 9b, 9c of transformer 9. When any one of detection signal from polarity detector 51 and PWM signal from PWM modulator 19, 44 has the low voltage level, nothing is produced from positive and negative AND gates 61 and 64 of changeover circuit 60, 65 to coincidentally keep first and second regulatory MOS-FETs 10, 11, 35, 36 off. Accordingly, actual AC pulse signals produced by alternately turning first and second regulatory MOS-FETs 10, 11, 35, 36 on and off, are supplied to speaker 15, 40 for activation as AC signals proportional to external input signal $V_{IN1}$, $V_{IN2}$ after high harmonic signals on or over audio frequency are removed from AC signals with low pass filtering circuit of choke coil 13, 38 and filtering capacitor 14, 39. In this case, without low pass filtering circuit of choke coil 13, 38 and filtering capacitor 14, 39, first and second regulatory MOS-FETs 10, 11, 35, 36 would produce AC output of waveforms unlike sine wave shown in FIG. 3(F).

In this embodiment, as AC voltage is directly induced on first and second secondary winding 9b, 9c of transformer 9 through the turning on and off operation of first and second main MOS-FETs 4 and 5 in oscillator 2, the power converter does not need any inverter or DC-AC converter to be connected to first and second secondary windings 9b and 9c of transformer 9 for simplification in circuit structure. In addition, polarity detector 51 can pick out polarity of AC voltage appearing on first and second secondary windings 9b, 9c of transformer 9, and PWM modulator 19, 44 can generate PWM signals the pulse width of which is varied in proportion to signals of potential difference between voltages of external input signals $V_{IN1}$, $V_{IN2}$ and applied to speaker 15, 40. PWM signals from PWM modulator 19, 44 and detection signals from polarity detector 51 are simultaneously supplied to changeover circuit 60, 65 to alternately apply drive pulse signals to each gate terminal of first and second regulatory MOS-FETs 10, 11, 35, 36 from changeover circuit 60, 65 through positive and negative drive circuits 25, 24, 50, 49. This causes first and second regulatory MOS-FET 10, 35, 11, 36 to alternately be turned on and off by PWM signals of pulse width modulated based on external input signals $V_{IN1}$, $V_{IN2}$ to provide speaker 15, 40 with AC power of voltage waveform similar to that of external input signals $V_{IN1}$, $V_{IN2}$ from first and second secondary windings 9b, 9c of transformer 9 through choke coil 13, 38 and filtering capacitor 14, 39. Accordingly, speaker 15, 40 can be operated with AC signals proportional to external input signals $V_{IN1}$, $V_{IN2}$ without rectifier or commutator of relatively large potential drop in the forward direction and with reduced power loss in power amplifiers. Thus, electricity controller 12, 37 can involve MOS-FETs of relatively small potential drop in the forward direction which can effectively control AC power supplied from first and second secondary windings 9b, 9c of transformer 9 to speakers 15, 40 for improvement in power conversion efficiency. In addition, PWM modulator 19, 44 can form PWM signals of varying pulse width by signals of potential difference between voltages of external input signals $V_{IN1}$, $V_{IN2}$ issued from output error amplifier 18, 43 and of AC power supplied to speaker 15, 40. Accordingly, for example, when voltages on first and second secondary windings 9b, 9c of transformer 9 rise with elevation in AC voltage E of commercial AC power source 1a, output error amplifier 18, 43 produces outputs of decreased voltage level to lower voltage applied to speaker 15, 40. In this way, electricity controller 12, 17 can cause voltage applied to speaker 15, 40 to follow amplitude of external input signals $V_{IN1}$, $V_{IN2}$ even though voltages induced on first and second secondary windings 9b, 9c of transformer 9 fluctuate advantageously without any stabilizer for voltage on first and second secondary windings 9b, 9c of transformer 9.

First embodiment shown in FIG. 1 utilizes oscillator 2 of half-bridge type which comprises first and second main MOS-FETs 4, 5 and two capacitors 3a, 3b, however, the power converter of the present invention can produce AC voltage of rectangular waveform with the 50% duty ratio on the secondary side. To this end, in a second embodiment of the invention shown in FIG. 4, the power converter can comprise an input smoothing capacitor 3 connected to output terminals of rectifying bridge circuit 1b, and an oscillator 2 of full-bridge type which comprises first and second auxiliary MOS-FETs 4a, 5a in lieu of two capacitors 3a, 3b. Otherwise, in a third embodiment of the invention shown in FIG. 5, the power converter can comprise an input smoothing capacitor 3 connected to output terminals of rectifying bridge circuit 1b and a series circuit connected in parallel to input smoothing capacitor 3 which includes a first series circuit of a first main MOS-FET 4 and a first primary winding 9a of transformer 9, and a second series circuit of a second main MOS-FET 5 and a second primary winding 9f of transformer 9 with adjacent ends of the first and second primary windings 9a and 9f being connected to each other to form oscillator 2 of push-pull type. Similar operations, functions and effects to those in the first embodiment of FIG. 1 can also be obtained in second and third embodiments shown in FIGS. 4 and 5.

In another aspect, the power converter of FIG. 2 may comprise an inverter 66 in place of buffer amplifier 56 in chopping wave oscillator 55. In the circuitry shown in FIG. 6, polarity detector 51 produces a detection signal of high and low voltage levels to chopping wave oscillator 55 which thereby generates respectively increasing and decreasing ramp voltages shown in FIG. 7(B). Specifically, chopping wave oscillator 55 of FIG. 6 produces rectangular wave signals shown in FIG. 7(B) of opposite phase to that of rectangular wave signals of FIG. 3(B) generated from chopping wave oscillator 55 of FIG. 2. Thereby, positive AND gate 61 switches the output signals from low to high voltage level as shown in FIG. 7(D) in synchronization with leading edge of output signal voltage from PWM modulator 19 shown in FIG. 7(C), and negative AND gate 64 switches output signals from low to high voltage level as shown in FIG. 7(E) in synchronization with trailing edge of output signal voltage from PWM modulator 19 shown in FIG. 7(C). Likewise, positive AND gate 61 switches the output signals from high to low voltage level as shown in FIG. 7(D) in synchronization with trailing edge from positive to negative area shown in FIG. 7(A) of output voltage from detective secondary winding 9*d* of transformer 9, and negative AND gate 64 switches output signals from high to low voltage level as shown in FIG. 7(E) in synchronization with leading edge of output voltage from negative to positive area shown in FIG. 7(A) from detective secondary winding 9*d* of transformer 9. Accordingly, first and second regulatory MOS-FETs 10, 11 can be turned from off to on at the time of voltage level inversion in output signals from PWM modulator 19, and also first and second regulatory MOS-FETs 10, 11 can be turned from on to off at the time of voltage level inversion in detection signals of polarity detector 51. In this way, in the embodiment shown in FIG. 6, as voltage on each secondary windings 9*b*, 9*c*, 9*d* of transformer 9 is inverted in polarity, upon shift of first or second regulatory MOS-FETs 10, 11, 35, 36 from on to off, no backward voltage occurs induced from drain to source terminal of first and second regulatory MOS-FETs 10, 11, 35, 36. This can inhibit surge voltage to appear on drain terminal of each regulatory MOS-FET 10, 11, 35, 36 upon turning-off of first and second regulatory MOS-FETs 10, 11, 35, 36, and simultaneously reduce switching noise thereof. Also, without backward voltage applied between drain and source terminals of first and second regulatory MOS-FETs 10, 11, 35, 36, power loss can be suppressed which is resulted from a primary breakdown in parasitic diodes 10*a*, 11*a*, 35*a*, 36*a* in each regulatory MOS-FETs 10, 11, 35, 36 to improve power conversion efficiency.

Moreover, inverter 63 in changeover circuit 60 may be replaced with that shown in FIG. 8 connected between buffer amplifier 54 in polarity detector 51 and the other input terminal of positive AND gate 61 in changeover circuit 60. In the circuitry shown in FIG. 8, positive AND gate 61 switches the output signal from low to high voltage level as shown in FIG. 9(D) in synchronization with leading edge of output voltage from PWM modulator 19 shown in FIG. 9(C), and negative AND gate 64 switches the output signal from low to high voltage level shown in FIG. 9(E) in synchronization with trailing edge of output voltage from PWM modulator 19 shown in FIG. 9(C). Likewise, positive AND gate 61 switches the output signal from high to low voltage level as shown in FIG. 9(D) in synchronization with leading edge of output voltage from negative to positive area from detective secondary winding 9*d* of transformer 9 as shown in FIG. 9(A), and negative AND gate 64 switches the output signal from high to low voltage level shown in FIG. 9(E) in synchronization with trailing edge of output voltage from positive to negative area from detective secondary winding 9*d* of transformer 9 as shown in FIG. 9(A). Accordingly, first and second MOS-FET 10, 11 can be turned from off to on at the time of voltage level inversion of output signal from PWM modulator 19, and first and second MOS-FET 10, 11 can be turned from on to off at the time of voltage level inversion of detection signal from polarity detector 51. Consequently, even in the fifth embodiment of the invention shown in FIG. 8, voltage polarity of each secondary winding 9*b*, 9*c*, 9*d* of transformer 9 is inverted at the moment of first or second regulatory MOS-FET 10, 11, 35, 36 being turned from on to off, no backward voltage occurs which is applied from drain to source terminal of first and second regulatory MOS-FETs 10, 11, 35, 36. Similar functions and effects to those in the fifth embodiment of FIG. 6 can also be obtained in the fifth embodiment shown in FIG. 8.

Embodiments of the present invention may be further modified in various ways without limitation to the foregoing embodiments. For example, the above-mentioned embodiments employ PWM modulator 19, 44 for varying pulse width of pulse signals produced in proportion to amplitude of external input signals $V_{IN1}$, $V_{IN2}$, but unlike this, pulse density modulation (PDM) may be made utilizing a $\Delta\Sigma$ (delta sigma) modulator. In lieu of choke coil 13, 38 for low pass filtering circuit, leakage inductance may be used which is formed from coarse magnetic coupling of first and each secondary windings 9*a*, 9*b*, 9*c*, 9*d* of transformer 9. In this configuration, a low pass filtering circuit can be formed by leakage inductance of transformer 9 and filtering capacitor 14, 39 without separate choke coil 13, 38 to reduce the number of components and cost for manufacture, and downsize the power converter. In addition, the aforesaid embodiments indicate choke coils 13, 38 connected between first and second secondary windings 9*b*, 9*c* of transformer 9 and first regulatory MOS-FET 10, 35. Otherwise, in place of or in addition to this arrangement, choke coil 13, 38 can be also connected between first regulatory MOS-FET 10, 35 and filtering capacitor 14, 39, between first and second secondary windings 9*b*, 9*c* of transformer 9 and second regulatory MOS-FET 11, 36 or between second regulatory MOS-FET 11, 36 and filtering capacitor 14, 39.

The present invention is preferably applicable to power converters such as low frequency power amplifiers for use in acoustic equipment such as stereos or radios and communications equipment such as cellular phones or personal handyphone systems.

What is claimed are:

1. A power converter comprising:
   at least two main switching elements connected in series to a DC power source;
   an oscillator which has at least two capacitors or at least two subsidiary switching elements connected in parallel to said main switching elements and in series to said DC power source;
   a primary winding of a transformer connected between a junction of said two main switching elements and a junction of said two capacitors or of said two subsidiary switching elements;
   an output circuit which comprises first and second regulatory switching elements connected between respectively one and the other ends of a secondary winding of said transformer and an electric load;
   a polarity detector for detecting the polarity of AC voltage produced on said secondary winding of transformer by the on and off operation of said switching elements in said oscillator to generate detection signals;
   a drive circuit for receiving detection signals from said polarity detector to control the on and off operation of said first and second regulatory switching elements;
   a choke coil connected in said output circuit;
   a filtering circuit connected in parallel to said load;
   a pulse modulator for forming pulse-modulated signals having the varying pulse width or pulse density by potential difference between voltage from external input signals and applied voltage to the load; and a changeover circuit for turning said first regulatory switching element on when both of voltage levels of pulse-modulated signals from said pulse modulator and of detection signals from said polarity detector are simultaneously on a first level, and turning said second regulatory switching element on when both of voltage levels of pulse-modulated signals from said pulse modulator and of detection signals from said polarity detector are simultaneously on a second level;

wherein AC power of voltage waveform similar to that of external input signals is supplied from said second secondary winding of said transformer through said choke coil and filtering capacitor to said load by alternately turning said first and second regulatory switching elements on and off.

2. A power converter comprising:

an oscillator which includes two series circuits connected to each other and in series to DC power source, each of the series circuits having a main switching element and a primary winding;

an output circuit which comprises a first regulatory switching element connected between one end of a secondary winding of the transformer and a load, and a second regulatory switching element connected between the other end of said secondary winding of the transformer and the load;

a polarity detector for detecting polarity of AC voltage produced on said secondary winding by turning on and off operation of said main switching elements in the oscillator to produce detection signals;

a drive circuit for turning said first and second regulatory switching elements by detection signals from said polarity detector;

a choke coil connected in said output circuit;

a filtering circuit connected in parallel to said load;

a pulse modulator for forming pulse-modulated signals having the varying pulse width or pulse density by potential difference between voltage from external input signals and applied voltage to the load; and a changeover circuit for turning said first regulatory switching element on when both of voltage levels of pulse-modulated signals from said pulse modulator and of detection signals from said polarity detector are simultaneously on a first level, and turning said second regulatory switching element on when both of voltage levels of pulse-modulated signals from said pulse modulator and of detection signals from said polarity detector are simultaneously on a second level;

wherein AC power of voltage waveform similar to that of external input signals is supplied from said second secondary winding of said transformer through said choke coil and filtering capacitor to said load by alternately turning said first and second regulatory switching elements on and off.

3. The power converter of claim 1 or claim 2, wherein said first or second regulatory switching element is switched from off to on upon voltage level inversion of the pulse-modulated signals from said pulse modulator, said first or second regulatory switching element is switched from on to off upon voltage level inversion of detection signals from said polarity detector.

4. The power converter of claim 1 or claim 2, wherein said choke coil comprises a leakage inductance of said transformer.

5. The power converter of claim 1 or claim 2, wherein each of said main switching elements are alternately turned on and off with the 50% duty ratio.

6. A power converter comprising:

at least two main switching elements connected in series to a DC power source;

an oscillator which has at least two capacitors or at least two subsidiary switching elements connected in parallel to said main switching elements and in series to said DC power source;

a primary winding of a transformer connected between a junction of said two main switching elements and a junction of said two capacitors or of said two subsidiary switching elements;

an output circuit which comprises first and second regulatory switching elements connected between respectively one and the other ends of a secondary winding of said transformer and an electric load;

a polarity detector for detecting the polarity of AC voltage produced on said secondary winding of transformer by the on and off operation of said switching elements in said oscillator to generate detection signals;

a drive circuit for receiving detection signals from said polarity detector to control the on and off operation of said first and second regulatory switching elements;

a choke coil connected in said output circuit;

a filtering circuit connected in parallel to said load;

a pulse modulator for forming pulse-modulated signals having the varying pulse width or pulse density by potential difference between voltage from external input signals and applied voltage to the load; and a changeover circuit for turning said first regulatory switching element on when said pulse modulator produces pulse-modulated signals of a first voltage level and said polarity detector produces detection signals of a second voltage level, and turning said second regulatory switching element on when said pulse modulator produces pulse-modulated signals of a second voltage level, and said polarity detector produces detection signals of a first voltage level;

wherein AC power of voltage waveform similar to that of external input signals is supplied from said second secondary winding of said transformer through said choke coil and filtering capacitor to said load by alternately turning said first and second regulatory switching elements on and off.

7. A power converter comprising:

an oscillator which includes two series circuits connected to each other and in series to DC power source, each of the series circuits having a main switching element and a primary winding;

an output circuit which comprises a first regulatory switching element connected between one end of a secondary winding of the transformer and a load, and a second regulatory switching element connected between the other end of said secondary winding of the transformer and the load;

a polarity detector for detecting polarity of AC voltage produced on said secondary winding by turning on and off operation of said main switching elements in the oscillator to produce detection signals;

a drive circuit for turning said first and second regulatory switching elements by detection signals from said polarity detector;

a choke coil connected in said output circuit;

a filtering circuit connected in parallel to said load;

a pulse modulator for forming pulse-modulated signals having the varying pulse width or pulse density by potential difference between voltage from external input signals and applied voltage to the load; and a changeover circuit for turning said first regulatory switching element on when said pulse modulator produces pulse-modulated signals of a first voltage level and said polarity detector produces detection signals of a second voltage level, and turning said second regulatory switching element on when said pulse modulator produces pulse-modulated signals of a second voltage level, and said polarity detector produces detection signals of a first voltage level;

wherein AC power of voltage waveform similar to that of external input signals is supplied from said second secondary winding of said transformer through said choke coil and filtering capacitor to said load by alternately turning said first and second regulatory switching elements on and off.

8. The power converter of claim 6 or claim 7, wherein said first or second regulatory switching element is switched from off to on upon voltage level inversion of the pulse-modulated signals from said pulse modulator, said first or second regulatory switching element is switched from on to off upon voltage level inversion of detection signals from said polarity detector.

9. The power converter of claim 6 or claim 7, wherein said choke coil comprises a leakage inductance of said transformer.

* * * * *